3,737,377
PURIFICATION OF LACTASE
Moshe Sternberg, South Bend, Ind., assignor to Miles Laboratories, Inc., Elkhart, Ind.
No Drawing. Filed Jan. 27, 1971, Ser. No. 110,316
Int. Cl. C07g 7/02
U.S. Cl. 195—66 R 7 Claims

ABSTRACT OF THE DISCLOSURE

Lactase can be isolated and separated from impurities by mixing a lactase-containing solution with a polyacrylic acid to form a precipitate with the lactase. The resulting precipitate is then separated from the remaining solution. Useful polyacrylic acids have a molecular weight of at least about one million.

BACKGROUND AND PRIOR ART

Lactase or beta-galactosidase is an enzyme which is known to be capable of catalyzing the hydrolysis of lactose to form glucose and galactose. This enzyme activity is especially useful in the processing of milk products. When it is desired to concentrate milk to a high solids content, the lactose in the milk tends to crystallize and prevent such concentration. In this case lactase is added to the milk to convert the lactose to other sugars which will not solidify in the subsequently concentrated milk. It is often desired to increase the solids content of ice cream, for example, by adding whey to the ice cream mixture. The lactose content of the whey will crystallize upon freezing of the ice cream mixture and produce an undesirable product. In this case lactase is added to the whey prior to its inclusion in the ice cream mixture so that a desirable product is obtained.

Lactase is known to be produced by the growth of various organisms on suitable nutrient media. Illustrative useful organisms are *Saccharomyces fragilis, Bacillus megaterium, Neurospora crassa, Streptococcus lactis,* and *Aspergillus oryzae.* The organism most frequently used in the prior art was *Saccharomyces fragilis.* When *S. fragilis* is employed, the lactase enzyme is formed within the *S. fragilis* yeast cells. These cells are harvested by filtration or centrifugation from the growth medium and are then generally dried by various known techniques. The resulting dried powder is then used to impart lactase activity to the milk products. Since the whole dried growth cells are used, the contained lactase is thus contaminated with other cell constitutents. The prior art discusses various ways of overcoming this contamination. Lactase activators, such as compounds containing an active sulfur atom, are added to improve the lactase action. Another known prior art technique is to extract the lactase from the growth cells with a mixture of potassium hydrogen phosphate and potassium dihydrogen phosphate, add acetone to the extractant to precipitate the lactase, dissolve the precipitate in water, add sucrose and spray dry to form a lactase-sucrose powder product. While the prior art describes the lactase products obtained from such isolation and purification techniques as being stable, having a good color, and producing satisfactory flavor in milk products, the commercially available *S. fragilis* lactase, for example, produces undesirable taste and smell in treated milk products and is generally unstable.

SUMMARY OF THE INVENTION

In accordance with the present invention, a process is provided for isolating and purifying lactase which comprises mixing a lactase solution containing impurities with a polyacrylic acid to form a precipitate between the lactase and the polyacrylic acid, and then separating the resulting precipitate from the remaining impurity-containing solution. The so-purified precipitate can then be conveniently dried or it can be dissolved for further use if desired. This process has the advantage of isolating a purified form of lactase while still retaining an appreciable amount of the lactase enzyme activity. If the lactase is to be used in human food applications, the residual polyacrylic acid in the precipitate complex can be removed.

DESCRIPTION OF THE INVENTION

The process of the present invention is useful for purifying lactase in various forms. It can be in the form of aqueous whole cultures and fermentation beers known in the art. It can also be in the form of impure dried material which is then dissolved in aqueous media for use in the present process. The concentration of lactase in the aqueous solution is not critical. As is known in the art, dilute solutions will require large quantities of liquid material to be processed in order to purify a given quantity of lactase. The more concentrated solutions will enable a given quantity of lactase to be purified with less effort and in a shorter period of time. In the preferred form of the invention, the lactase-containing raw material is produced by fermentation of a strain of *Aspergillus niger* or *Aspergillus foetidus.* Such organisms produce the lactase in the fermentation beer rather than within the mycelium.

The polyacrylic acids useful in the present invention are well-known in the art and are prepared by polymerization of acrylic acid or acrylic acid derivatives such as acrylamide or acrylic esters with subsequent hydrolysis to generate free carboxyl groups. It is preferred that the polyacrylic acid have a molecular weight of at least about one million. It is especially preferred that the polyacrylic acid have an average molecular weight of about three to five million. Suitable polyacrylic acids are marketed under the trade names Carbopol 934, 940, 941, 960 and 961 by the B. F. Goodrich Chemicals Co. These finely-divided materials are all soluble or readily dispersible in water.

In the practice of this invention an aqueous solution of lactase is mixed with the polyacrylic acid or a solution of the polyacrylic acid. The polyacrylic acid is employed in an amount such that the resulting mixture contains from about 0.1 to about 1 percent (weight/volume basis) polyacrylic acid based on the total volume of the mixture. The pH of the lactase solution should be in the range of from about 2.5 to about 5 when it is mixed with the polyacrylic acid. When the pH is below about 2.5, the lactase will lose substantially all its enzyme activity. When the pH is above about 5, no precipitate will form. Preferably the pH is from about 3 to about 4. The mixing temperature and the mixing time between the polyacrylic acid and the lactase-containing solution are not narrowly critical. A mixing temperature of from about 15° C. to about 45° C. and a mixing time of from about 15 minutes to about 90 minutes are suitable.

The above-prepared precipitate can be separated by filtration, centrifugation or other convenient means from the remaining impurity-containing solution. The resulting solid material can be dried by convenient means and used in the dry form for its lactase activity. If the lactase is to be employed in treating human or animal foods, it is desirable to remove all traces of polyacrylic acid. The lactase-polyacrylic acid precipitate complex is dissolved by mixing it with an aqueous medium having a pH between about 5 and about 9, preferably between about 6 and about 8.5. To the resulting solution is then added a water-soluble calcium salt, such as calcium acetate, calcium chloride, calcium gluconate and the like, a water-soluble aluminum salt, such as aluminum potassium sulfate, aluminum sulfate and the like, or a water-soluble iron salt, such as ferric sulfate, ferric chloride, ferric nitrate and the like. These added materials can form a solid complex at pH values above about 5 with the polyacrylic acid, and the resulting complex can be separated from the purified lactase solution. The resulting highly purified lactase solution can be used "as-is" or it can be dried by convenient means, such as freeze-drying techniques, for further use.

The process of the present invention isolates and purifies lactase while retaining a significant amount of enzyme activity. The following method was employed to assay for lactase activity in the starting material and in the isolated purified product.

A buffered lactose solution was prepared by dissolving 11.1 g. lactose in 75–80 ml. hot distilled water, cooling to room temperature and adding 5 ml. of a 2 molar aqueous acetate buffer at pH 4.0, and then diluting the mixture to 100 ml. The 2 molar aqueous acetate buffer was previously prepared by adding 115 ml. glacial acetic acid to about 600 ml. distilled water and then adjusting to pH 4.0 with concentrated sodium hydroxide. The resulting solution was then diluted to 1.0 liter with distilled water. A 9.0 ml. portion of the above buffered lactose solution was pipetted into each of two 25 mm. x 150 mm. test tubes and heated to 60° C. in a water bath. A 1.0 ml. portion of an appropriately diluted lactase solution being assayed was then blown into one of the test tubes and swirled to mix. A 1.0 ml. portion of distilled water was placed in the other test tube to form a substrate blank. After exactly 15 min. a 1.0 ml. portion of 1.0 N hydrochloric acid was added to each test tube, swirled to mix and cooled to room temperature. The lactase solution being assayed was originally diluted so as to contain 0.2–0.5 lactase units/ml. or to have an absorbance of 0.1–0.4 as measured with a wavelength of 525 millimicrons.

A diluted sodium hydroxide solution was prepared by dissolving 80 g. sodium hydroxide in distilled water and diluting to about 1100 ml. A mixture of a 4.5 ml. portion of 2 molar acetate buffer at pH 4.0, about 100 ml. distilled water and 10 ml. 1.0 N hydrochloric acid was prepared. This mixture was titrated to pH 5.5, as measured with a pH meter, with the sodium hydroxide solution. The resulting titer multiplied by 100 was the volume of sodium hydroxide to be diluted to 1.0 liter. A 1.0 ml. portion of the above-prepared diluted sodium hydroxide solution was then added to the above acidified test tube contents. The resulting solution was the enzyme hydrolysis assay product.

A glucose oxidase reagent was prepared by filling a 100 ml. volumetric flask about two-thirds with 0.1 molar acetate buffer at pH 5.5. This acetate buffer was prepared by adjusting 50 ml. of the above-described 2 molar acetate buffer at pH 4.0 to pH 5.5 with sodium hydroxide and diluting to 1.0 liter with distilled water. A 1.0 ml. portion of 1 percent (weight/volume basis) aqueous o-dianisidine hydrochloride solution was then added to the volumetric flask containing the acetate buffer. A 0.1 ml. portion of a peroxidase-glucose oxidase solution was then added to the flask. The flask was then diluted to volume with 0.1 molar acetate buffer at pH 5.5 and stored in ice. The above peroxidase glucose oxidase solution was prepared by dissolving 500 mg. horseradish peroxidase in 5 ml. of purified liquefied glucose oxidase solution containing about 1000 glucose oxidase units per ml.

A 4.0 ml. portion of the above glucose oxidase reagent was then placed into each of three 25 mm. x 150 mm. test tubes and heated to 30° C. in a water bath. A 2 ml. portion of distilled water was then added to one test tube to form a reagent blank. A 2 ml. portion of standard glucose solution was then added to another test tube to form a glucose standard. The standard glucose solution was prepared by diluting 10 ml. of a 1 percent (weight/volume basis) aqueous glucose solution to 1.0 liter with distilled water.

When the glucose oxidase reagent test tubes were at the proper temperature, the above enzyme hydrolysis assay product was added to the third test tube containing glucose oxidase reagent. The resulting mixture was then poured into a clean test tube and then back into the original glucose oxidase reagent test tube. This gave a reproducible standard amount of mixing. At exactly 5 min. after adding the assay product to the glucose oxidase reagent, 8.0 ml. of 10 N sulfuric acid were added thereto and swirled to mix. The absorbance or optical density at a light source wavelength of 525 millimicrons was then measured for the resulting assay product as compared to the reagent blank. The absorbance or optical density was also measured at the same wavelength against distilled water for the substrate blank and the glucose standard. The activity of the lactase sample was then calculated by the following equation wherein a lactase activity unit is the amount of enzyme that will form 1 micromole of glucose from lactase in 15 min. under the given assay conditions:

$$\text{Activity (units/ml.)} = \frac{0.4444 \times \text{O.D. corr.}}{\text{O.D. std.} \times \text{dilution}}$$

wherein:

O.D. corr. = O.D. sample − O.D. substrate blank.
O.D. std. = O.D. of glucose standard.
Dilution = volume dilution of enzyme assay sample.

The invention will be further described in the following illustrative examples.

Example 1

An aqueous lactase solution was obtained by fermenting in a well-known manner an aqueous nutrient medium with a culture of a strain of *Aspergillus niger* and then filtering off the mycellium. A 5 liter portion of the resulting filtrate having a pH of 3.8 and at a temperature of about 27° C. was mixed with a 2 weight percent aqueous solution of Carbopol 934, which is a polyacrylic acid having an average molecular weight of about 3 to 5 million and is marketed by the B. F. Goodrich Chemicals Co. The concentration of polyacrylic acid in the resulting mixture was 0.3 percent (weight/volume basis). This mixture was then agitated for 30 minutes during which time a precipitate formed. The resultant mixture was filtered. The filter cake was suspended in water to a final volume of 5 liters. The pH was adjusted to 6.0 with a 4 weight percent aqeuous solution of sodium hydroxide. A 15 g. portion of $CaCl_2 \cdot 2H_2O$ was then added and the resulting mixture was stirred at room temperature (27° C.) for about 3 hours during which time a precipitate formed. The mixture was filtered, and the filtrate contained about 35 percent of the original lactase activity in a purified form.

Example 2

An aqueous lactase solution was obtained by fermenting in a well-known manner an aqueous nutrient medium with a strain of *Aspergillus foetidus* and then filtering off the mycelium. A 1 liter portion of the resulting filtrate having a pH of 3.2 and at a temperature of 20° C. was mixed with a 2 weight percent aqueous solution of Carbopol 934. The concentration of polyacrylic acid in the resulting mixture was 0.29 percent (weight/volume basis). This mixture was then agitated for 30 minutes during which time a precipitate formed. The resultant mixture was filtered. The filter cake was suspended in water to a final volume of 1 liter. The pH was adjusted to 7.0 with sodium bicarbonate and 3 g. of $CaCl_2 \cdot 2H_2O$ were added. The resulting mixture was stirred at room temperature for about 3 hours during which time a precipitate formed. The mixture was filtered and the filtrate contained about 100 percent of the original lactase activity in a purified form.

Example 3

A lactase-containing filtrate was produced from *Aspergillus foetidus* as described in Example 2. A 1.5 liter portion of the filtrate was mixed with Carbopol 934 to form a concentration of polyacrylic acid of 0.2 percent (weight/volume basis) based on the total mixture volume. This mixture was stirred for 30 minutes and the resulting precipitate removed by centrifugation. The resulting solids were separated and suspended in 500 ml. water. The pH was adjusted to 7.0 with solid sodium bicarbonate and 5 g. of aluminum sulfate were added. The resulting mixture was stirred for about 3 hours. The resulting precipitate was removed by filtration. The filtrate contained about 75 percent of the original lactase activity in a purified form.

Example 4

A lactase-containing filtrate was produced from *Aspergillus foetidus* as described in Example 2. A 1.5 liters portion of the filtrate was mixed with Carbopol 934 to form a concentration of polyacrylic acid of 0.3 percent (weight/volume basis) based on the total mixture volume. This mixture was stirred for 30 minutes and filtered. The filter cake was removed and separated into several portions. Each portion was suspended in 250 ml. water. To one portion were added 0.75 g. of aluminum potassium sulfate (alum). The pH was adjusted to 5.5 with 1 N sodium hydroxide. The mixture was stirred at room temperature for 3 hours and then filtered. The filtrate contained about 71 percent of the original lactase activity in a purified form. To a second portion were added 0.75 g. of ferric sulfate. The pH was adjusted to 5.5 with 1 N sodium hydroxide. This mixture was stirred at room temperature for 3 hours and then filtered. The filtrate contained about 68 percent of the original lactase activity in a purified form.

Example 5

The procedure of Example 1 was followed using 0.3 percent (weight/volume basis) of Carbopol 941, which is a polyacrylic acid having a molecular weight of about 1 million and is marketed by the B. F. Goodrich Chemicals Co.

Purified lactase can be isolated from the filtrates produced as described above. Such purified lactase has no undesirable flavor or odor when used to treat whey or milk. Such purified lactase is also stable under normal storage and use conditions.

What is claimed is:

1. A process for isolating and purifying lactase which comprises mixing a lactase solution containing impurities and having a pH of from about 2.5 to about 5 with a polyacrylic acid to form a precipitate between the lactase and the polyacrylic acid, and then separating the resulting precipitate from the remaining impurity containing solution.

2. A process according to claim 1 wherein the concentration of the polyacrylic acid in the lactase solution is from about 0.1 to about 1 percent (weight/volume basis).

3. A process according to claim 1 wherein the pH of the lactase solution is from about 3 to about 4.

4. A process according to claim 1 wherein the polyacrylic acid has a molecular weight of at least about one million.

5. A process according to claim 1 wherein the polyacrylic acid has an average molecular weight of about three to five million.

6. A process according to claim 1 wherein the precipitate separated from the impurity-containing solution is dissolved by mixing with an aqueous solution having a pH between about 5 and about 9, the resulting solution is mixed with a substance selected from the class consisting of water-soluble calcium salts, water-soluble aluminum salts and water-soluble iron salts to form a precipitate with any polyacrylic acid present, and any resulting precipitate is separated from the remaining purified lactase solution.

7. A process according to claim 6 wherein the pH of the dissolving solution is from about 6 to about 8.5.

References Cited
UNITED STATES PATENTS
3,629,073   12/1971   Cayle _____ 195—66 R LIONEL M. SHAPIRO, Primary Examiner